May 24, 1927.  K. E. PEILER  1,629,926
MOLD CHARGE GUIDING DEVICE
Filed May 2, 1925
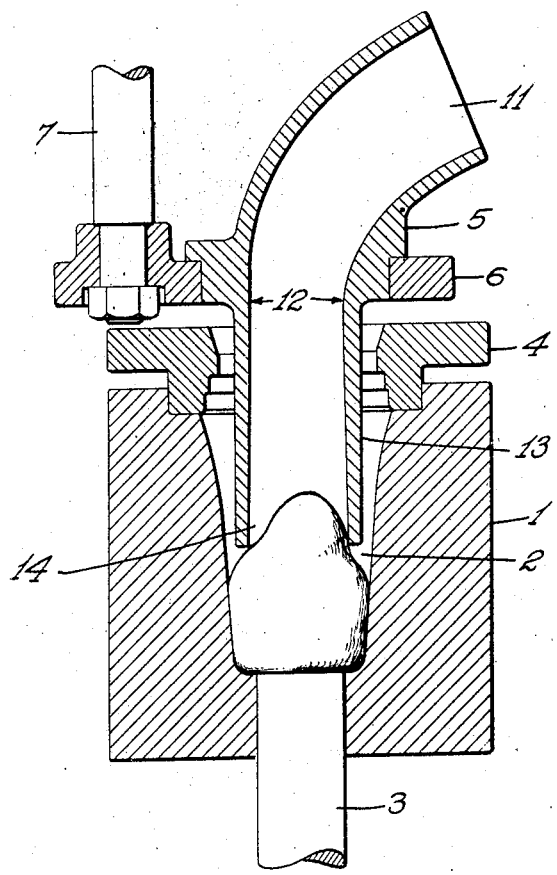
Inventor:
Karl E. Peiler
by Robt. D. Brown
Att'y.

Patented May 24, 1927.

1,629,926

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MOLD-CHARGE GUIDING DEVICE.

Application filed May 2, 1925. Serial No. 27,442.

The invention relates to glass working machines and it has particular relation to devices for directing mold charges into the molds of a forming machine.

In present practice the mold charge is delivered to the mold cavity by a guiding member which either seats upon the upper surface of the body of the mold or is located directly above the mold. For certain kinds of ware or molds it is necessary or desirable to have the charge assume a low squat shape at the lower end of the mold before the molding operation. Frequently the mold cavity is of such shape and proportion as to render it difficult to deliver mold charges into it and yet have such charges assume the proper shape after delivery. This is particularly true of certain press molds in which when the charge emerges from the guide as used at present, there is a tendency for it to fall or slump toward one side or the other and out of central relation with the pressing plunger, so that the glass in being forced up into the annual space between the plunger and the mold wall is higher on one side than on the other and must be distributed around the plunger after contact with the mold ring. This is not only liable to cause unequal wall thickness of the ware, but imposes a severe sidewise strain between the mold and the plunger, tending to wear these elements excessively, particularly where the plunger bears against the mold ring.

The object of this invention is to deliver a mold charge in a compact and symmetrical mass at the bottom of the mold and concentric therewith so as to secure a uniform distribution of the glass around the plunger throughout the pressing operation.

This is accomplished by projecting the funnel, deflector or other guiding means into the mold cavity so that a charge emerging therefrom will be deposited directly in the bottom of the mold cavity and in an accurately centered position, without contact with the upper portion of the walls of the mold. In some instances, particularly where relatively long mold charges are being delivered to the mold, it is desirable to project the guiding member sufficiently far into the mold cavity that the distance between the lower edge of the guiding member and the bottom of the mold cavity is less than the length of the mold charge. By so doing, the upper end of the mold charge remains in engagement with the guiding member after contact with the bottom of the mold and is thereby prevented from falling over while the lower portion is spreading laterally in the mold.

By the time that the mold charge has settled sufficiently to maintain its upright position, the guiding member may be removed and the pressing operation may be begun. In most instances the length of the mold charge is diminished to such an extent by settling and spreading laterally that the upper end resembles a relatively low hump or protuberance which has no tendency to slump laterally after the withdrawal of the guiding member, and which either settles or is pressed into the center of the mass of glass without causing the disadvantage heretofore encountered.

The single figure of the accompanying drawing is a vertical sectional view through a mold and guiding member, illustrating a mold charge delivered to the mold and supported by the lower portion of the guiding member.

Referring to the drawing, the numeral 1 indicates a mold having a mold cavity 2, a bottom valve 3, and a mold ring 4. A guiding member 5, shown as comprising a combined funnel and deflector, is mounted upon a support 6 for movement into and out of cooperative relation with the mold. The support 6 is carried by a vertical rod 7 which is reciprocated vertically by any suitable mechanism, not shown.

The guiding member 5 is formed with a flared upper or entrance end 11, a restricted portion 12, and an extension 13 which is adapted to be projected through the mold ring directly into the mold cavity. This extension is preferably also flared slightly, as indicated at 14, so as to prevent the glass from wedging in the lower portion thereof after passing through the restricted portion of the funnel. The extension 14 is of such length, and is projected sufficiently far into the mold cavity, that it will remain in laterally supporting engagement with a mold charge after the latter is deposited in the bottom of the cavity, and will prevent the upper portion of the mold charge from tilting laterally or slumping over against one side or the other of the mold.

After a mold charge has been delivered into the mold and allowed to settle sufficiently, the funnel is withdrawn from the cavity and the mold ring so as to permit the entrance of a pressing plunger, not shown, to perform the pressing operation. The guiding member may be moved aside by suitable mechanism, not shown, in cases where the mold is located permanently at a fixed pressing station, to permit the plunger to descend into the mold. When the device is embodied in a machine having a moving mold table, it is only necessary to raise the funnel sufficiently to allow the mold and mold ring to pass on to its succeeding pressing station.

While I have shown and described the invention as being applied to a glass pressing machine, it should be understood that it may also be utilized in glass blowing machines, and particularly the narrow neck type in which the mold charge is fed to an inverted parison mold and blown therein.

The particular embodiment of the invention illustrated and described has been selected by way of example only, and it is to be understood that various modifications, arrangements, and combinations may be employed in fulfilling the spirit of the invention as defined in the claims.

I claim as my invention:

1. In combination with a glass shaping mold, a guiding member adapted to be projected into the mold cavity in spaced relation with the walls and bottom thereof to deposit a mold charge in the bottom of said cavity and prevent contact between the charge and the upper wall of said mold.

2. In combination with a glass shaping mold, a guiding member adapted to be projected into the mold cavity to deposit a mold charge in the bottom of said cavity and provide lateral support to the upper end of said charge until the lower portion thereof conforms to the configuration of the bottom of said cavity, said member being spaced from the bottom of said cavity to permit the charge to flow therebeneath and into contact with the lower portion of the walls of said cavity.

3. In combination with a glass shaping mold, a guiding member adapted to be projected into a mold cavity to deposit a mold charge in the bottom of said cavity and to prevent contact between said charge and the upper portion of the wall of said mold cavity, and to remain in contact with the upper portion of said charge until the lower portion thereof commences to settle laterally into said mold, said member being spaced from the bottom of said cavity a distance sufficient to permit the charge to settle out of contact with said member.

4. In combination with a glass shaping mold, a guiding member adapted to be projected into the mold cavity to deposit a mold charge in the bottom of said cavity, and to prevent contact between the mold charge and the walls of the upper portion of said cavity and to remain laterally in supporting engagement with said charge until the same has commenced to settle into the mold, the distance between the bottom of said member and the bottom of said cavity being greater than the height of the mold charge after it has settled in said cavity.

5. In combination with a glass shaping mold, a funnel adapted to be projected into the mold cavity and in spaced relation to the sides and bottom thereof to deposit a mold charge in the bottom of said cavity without contact with the walls of the upper portion thereof, said funnel having flared upper and lower portions and constricted intermediate portions.

6. In combination with a glass shaping mold, a funnel adapted to be projected into the mold cavity and in spaced relation to the sides and bottom thereof, to deposit mold charges in the bottom of said cavity without contact with the walls of the upper portion thereof, the internal diameter of the entrance and exit ends of said funnel being greater than that of the intermediate portion.

Signed at Hartford, Conn., this 1st day of May, 1925.

KARL E. PEILER.